Aug. 26, 1969     J. A. POWERS     3,463,566
AUTOMATIC ARTICLE-HANDLING SYSTEM
Filed Oct. 16, 1967     5 Sheets-Sheet 1

INVENTOR
JOSEPH A. POWERS.
BY
ATTORNEY

| RETRIEVE MODE | | |
|---|---|---|
| CONSOLE | EXTRACTOR | TRANSPORT |
| INPUT CLEAR | HOME POSITION | IDLE |
| CODED RETRIEVE COMMAND ENTERED | A SELECTED EXTRACTOR DRIVEN TO SELECTED ADDRESS BY HORIZONTAL AND VERTICAL DRIVE MECHANISM | |
| | CONTAINER EXTRACTED (LEFT OR RIGHT) | |
| | EXTRACTOR DRIVEN TO DISCHARGE POSITION | CONVEYOR BELTS START. |
| INPUT CLEAR | CONTAINER DISCHARGED | |
| CONTAINER ARRIVES AT CONSOLE READER | EXTRACTOR RETURNS TO HOME POSITION | |
| VERIFY | | |
| CONSOLE READER STOP RELEASED | | |
| DOCUMENTS FANNED FOR ACCESS | | IDLE |

FIG. 17.

| FILE MODE | | |
|---|---|---|
| CONSOLE | EXTRACTOR | TRANSPORT |
| INPUT CLEAR CONTAINER AT WORK STATION | HOME POSITION | IDLE |
| INITIATE FILE COMMAND ENTERED | | |
| DOCUMENT FANNER WITHDRAWN AND CONTAINER DEPOSITED ON FILE CONVEYOR | | CONVEYOR BELTS START |
| INPUT CLEAR | | CONTAINER ARRIVES AT SORTER READER |
| | | SELECTED GATE AUTOMATICALLY ENERGIZED |
| | | CONTAINER DEFLECTED TO APPROPRIATE AISLE READER |
| | CONVEYOR TRANSFERRED FROM READER TO EXTRACTOR | |
| | EXTRACTOR DRIVEN TO SELECTED ADDRESS IN RESPONSE TO AISLE READER COMMAND | IDLE |
| | CONTAINER DISCHARGED TO STORAGE BAY (LEFT OR RIGHT) | |
| | EXTRACTOR RETURNED TO HOME POSITION | |

United States Patent Office 3,463,566
Patented Aug. 26, 1969

3,463,566
AUTOMATIC ARTICLE-HANDLING SYSTEM
Joseph A. Powers, Williamsville, N.Y., assignor to Sperry Rand Corporation, New York, N.Y., a corporation of Delaware
Filed Oct. 16, 1967, Ser. No. 675,453
Int. Cl. A47b 81/00; B65g 1/06
U.S. Cl. 312—223
16 Claims

ABSTRACT OF THE DISCLOSURE

An article-handling system for selectively transporting article-carrying containers between a remote storage area and one or more operator work stations. The storage area is adapted to store a large quantity of containers in a plurality of parallel tiers in the nature of library book stacks or the like. The transporting apparatus includes conveyance means and associated regulation and control mechanisms to assure proper system control in response to various commands, such as a request initiated by a particular operator for a container stored at a coded address. At the work area each operator station is provided with adequate controls to enable selection and retrieval as well as filing of any of the coded containers, regardless of the relative disposition of the containers with respect to the system.

BACKGROUND OF THE INVENTION

The present invention relates to an article-handling system of the nature described above and more particularly to a new and useful system comprising a unique combination of apparatus for automatically retrieving and filing article-carrying containers or the like.

The retention and retrieval of original records is an essential prerequisite for the success of present and future business operations in such fields as insurance and banking, as well as being an obviously needed factor in public and private library and hospital facilities, government, educational and manufacturing complexes, and a host of other fields where records are relied on for continuous efficiency and success. Of course, the concept of storage of retrievable articles embodies more than the records and document media in many of these fields, e.g., books in libraries, merchandise in warehouses, and parts and subassemblies in factories.

It it not uncommon in many such present-day article storage systems to be faced with problems caused by unprecedented expansion requirements. For example, in the original document storage art rapid growth acceleration in many industries has resulted in mushrooming masses of original documents that must be retained as records while also being readily and rapidly accessible. When problems of any nature are encountered, it is always advantageous to provide a solution which retains inherent advantages of old systems while applying new technology. Article handling is no exception to this premise.

It is accordingly a feature of the present invention to provide a system which obviates many, if not all, of the present problems by making possible a reliable and economical article-handling system which swiftly and automatically retrieves and files articles which are stored at a remote location under nonoperative conditions. A principal but not sole advantage of the present system is that, by its very nature, it lends itself to expansion to accommodate any future demands.

SUMMARY OF THE INVENTION

A new and useful article-handling system is contemplated by the present invention. In one embodiment the system includes a unique combination comprising apparatus for storing a plurality of discrete articles at predetermined known locations identified by a coded address, an operator work station for controlling and having access to the system, retrieval apparatus for automatically transporting any selected article from storage to the operator, and refiling apparatus for automatically returning to storage and coded article.

More specifically, the described embodiment is directed to record storage and retrieval apparatus comprising in combination a plurality of record-carrying containers, a coding arrangement associated with each container representative of the storage address of the container, an extractor mechanism for transferring a selected container from storage to a cavity in the extractor and thence to a discharge position, conveyance apparatus for receiving at such discharge position the selected container from the extractor and delivering it to an operator work area at which the records are made accessible to the operator. The system further comprises apparatus of varying scope which includes means for verifying that loose documents or records are filed in a container having the proper code, various reading apparatus for sensing the code associated with a container when it is en route for its home location in the storage apparatus, sorting apparatus for deflecting containers to predetermind paths while being conveyed between the storage apparatus and the operator work station, and other apparatus, the functions of which will become apparent in the description that follows.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes only and are not to be construed as defining the limits of the invention.

DESCRIPTION OF THE PREFERRED EMBODIMENT

(A) General system

Figures 1, 4:
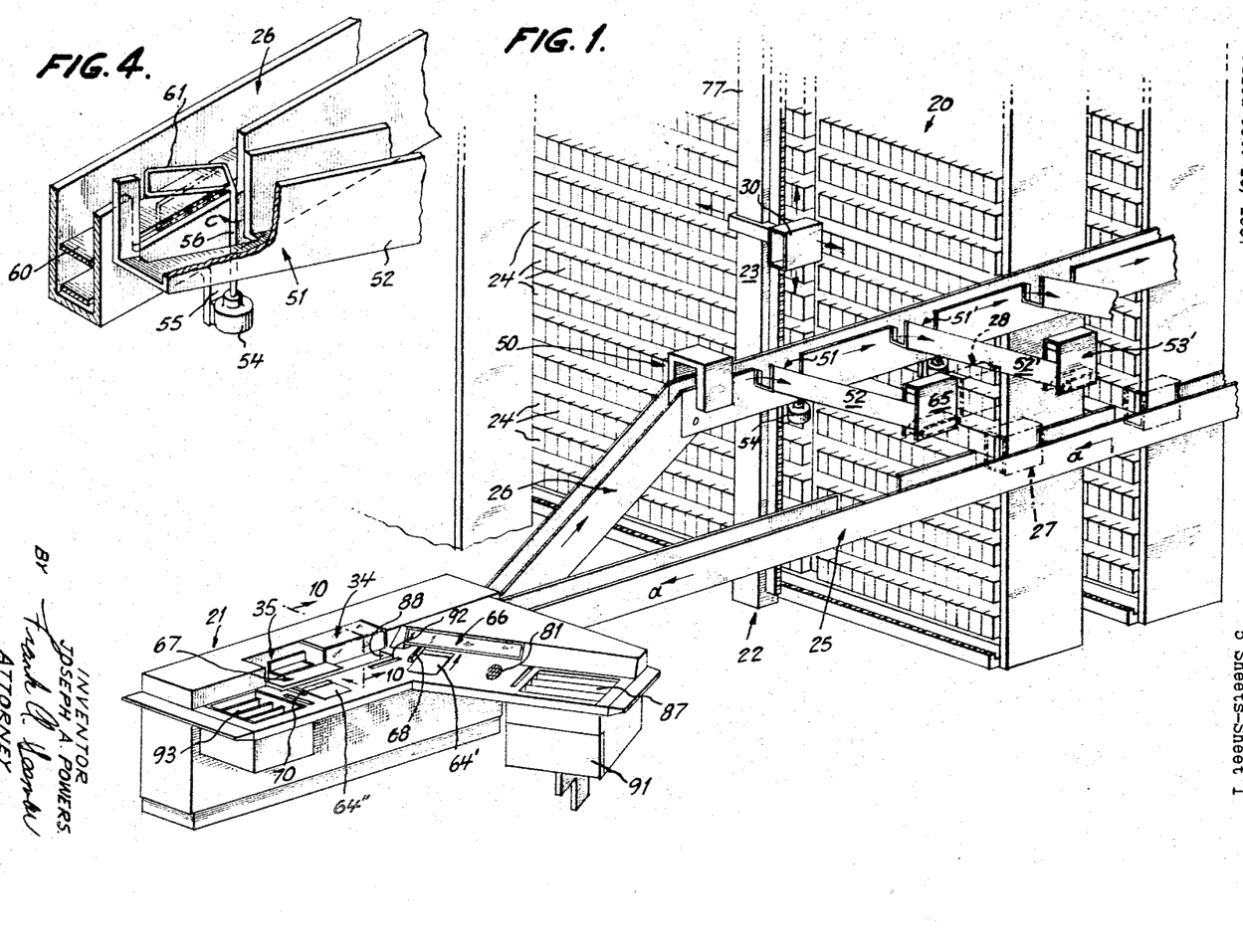
FIG. 1 is a perspective view of an improved article-handling system in which the apparatus embodying the present invention may be readily employed.
FIG. 4 shows in detail a gating mechanism employed in the system shown in FIG. 1.

Now referring to the drawings for a more detailed description, an article-handling system is shown in FIG. 1 to illustrate by way of example an embodiment of one type of system encompassed by the present invention. The reference numerals 20, 21 and 22 generally designate article-storage apparatus, a control console and transport apparatus, respectively, the latter of which is interposed between the storage area and the control console and is employed in the manner to be described for the conveyance of selected articles. Henceforth, the articles being handled will be referred to as containers for the purpose of the exemplary system. Prior to describing the specific structure of the system shown in FIG. 1, the general operational aspects of the system will be set forth to show the interrelationship between various components of the system. Specific operational steps employed by an operator making use of the system will be set forth in the section hereinbelow designated "Operation."

Input commands are provided at console 21 in response to which an extractor mechanism 23 withdraws any one of the many containers 24 in accordance with the particular command entered at the console. The selected container is then deposited on a first conveyor 25 in transport apparatus 23, for delivery to console 21 and appropriate follow-up action. When it is no longer necessary to have access to a retrieved container 24, it is automatically returned to its position in the storage apparatus via a second conveyor 26, in transport apparatus 22.

Storage apparatus 20 includes a plurality of multi-bay tiers arranged in opposing relationship and defining aisles in the face-to-face fashion of library book stacks. Each aisle is provided with an extractor mechanism 23 (only one of which is diagrammatically illustrated) which is positionable in horizontal and vertical directions adjacent any one of the storage bays, each of which is assigned a predetermined address readily identifiable by an appropriate code. The extractor mechanism is adapted to remove and restore rectangular containers from and to their storage position. One specific mechanism for carrying out this function is described in my copending application entitled "Article Handling Apparatus," filed Feb. 23, 1967, and bearing Ser. No. 618,119, which application is assigned to a common assignee and hereinafter is referred to as my extractor application. It should be noted that the term "extractor" is used throughout this description and the description of my extractor application in a broad sense in that it is intended to encompass a mechanism which files as well as extracts containers. Phantom outlines 27 and 28 (FIG. 1) of extractor 23 illustrate respectively two further positions employed during retrieve and file functions of the system.

Figure 2:
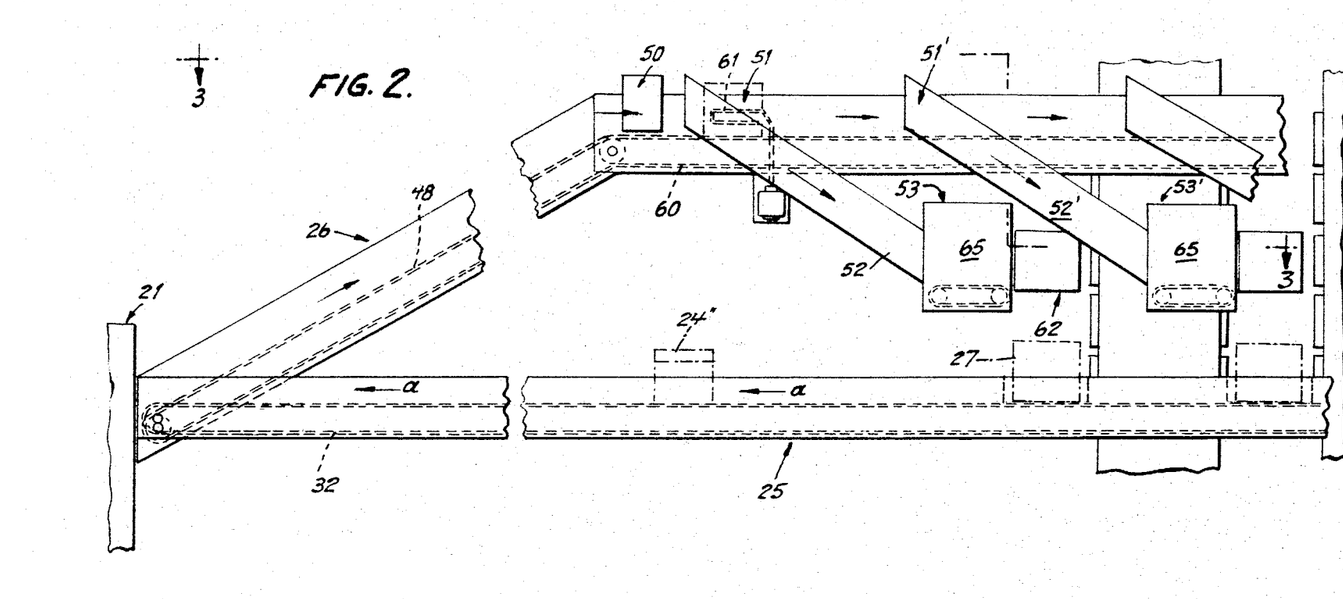
FIG. 2 is a partial side view of the system shown in FIG. 1.
Figure 3:
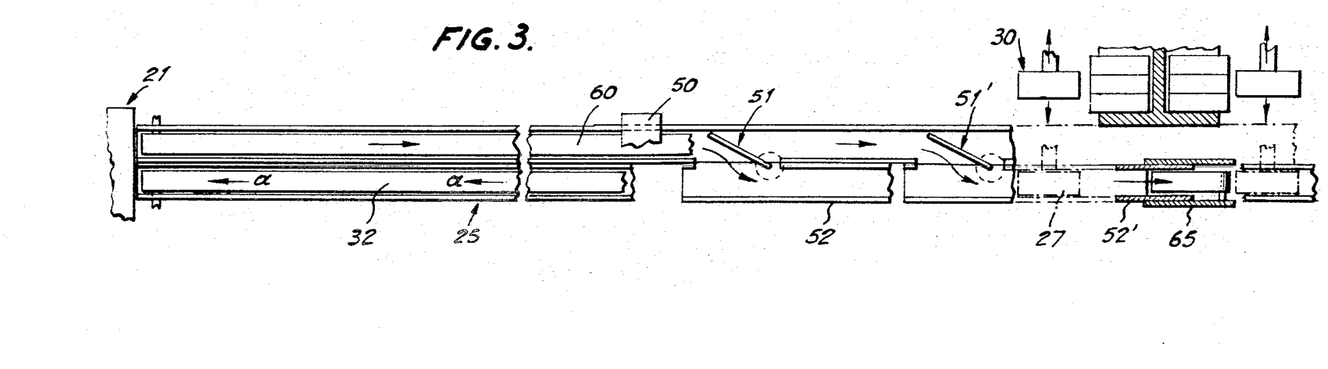
FIG. 3 is a sectional view taken along line 3—3 of FIG. 2.

Referring more specifically to the retrieve mode of the system, phantom outline 27 shown in FIGS. 2 and 3 further illustrates the position at which the extractor shuttle 30 cooperates with conveyor 25 to transfer a container thereto for delivery to console 21. Console 21, details of which are shown in FIGS. 1, 5 and 6, is adapted for providing access to a retrieved article after which it is returned to the filed portion of the system and thereby transferred to conveyor 26 for ultimate return to its home storage location.

Figures 5, 6, 7, 8, 9:
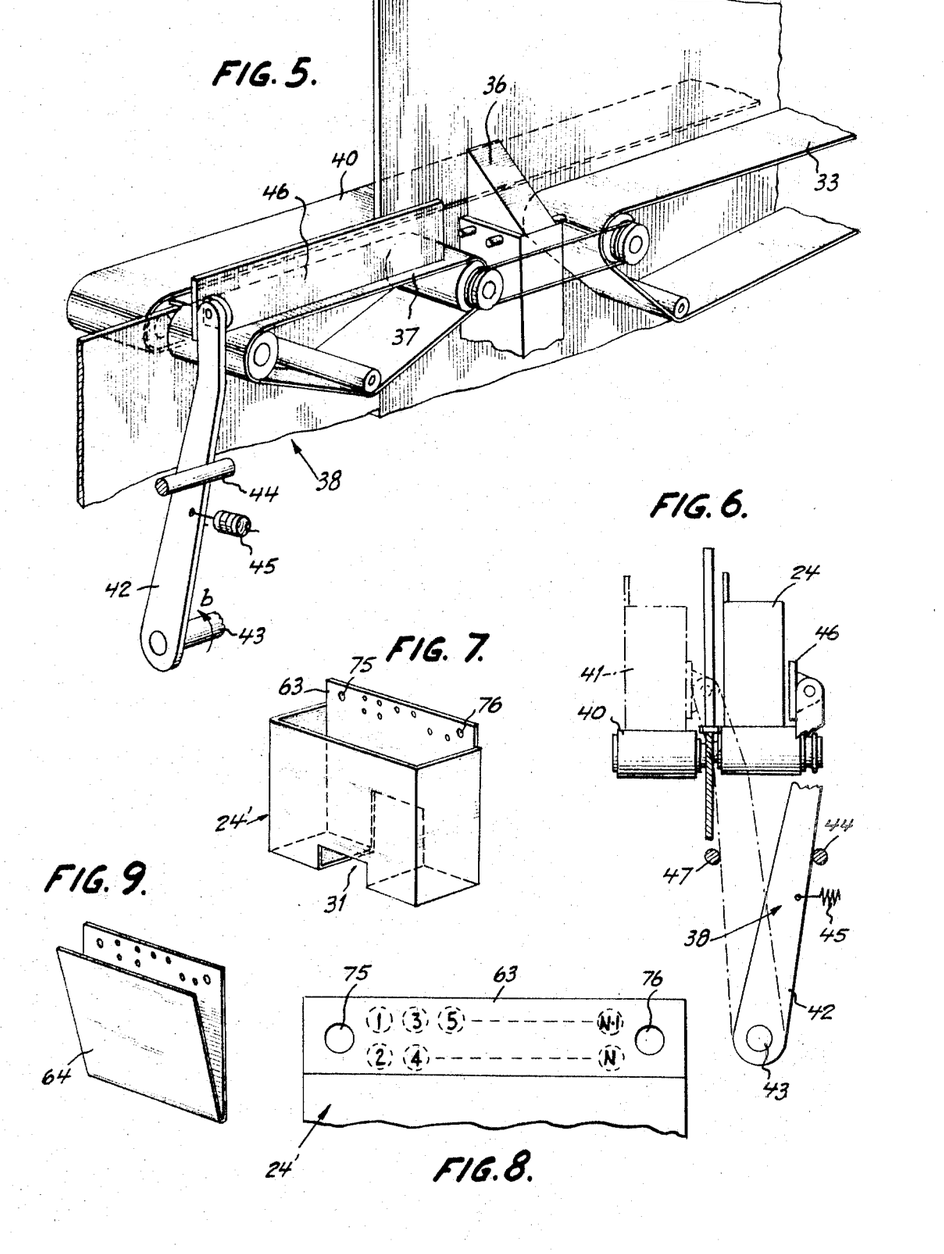
FIG. 5 is a cutaway view of the console shown in FIG. 1.
FIG. 6 is a side elevation of the container transfer mechanism shown in FIG. 5.
FIG. 7 is a perspective of the unique article-carrying container, which is part of the novel combination of the present invention.
FIG. 8 illustrates in detail the coded portion of the container shown in FIG. 7.
FIG. 9 shows a coded folder addressed for storage in the container of FIG. 7.

Now turning to the specific containers involved in the present system, reference is made to FIG. 7 which illustrates in perspective a rectangularly shaped container 24' comprising a box being accessible at the top thereof and also including a slotted portion 31. The purpose of this slot and the general configuration of the container are clearly described in my co-pending application entitled "Article Handling Apparatus," filed May 10, 1967, and bearing Ser. No. 637,446, referred to hereinafter as my console application. The latter application is also assigned to a common assignee. Although the container referred to in my console application is specifically adapted to accommodate filed folders for retaining documents and records or the like, it should be noted that my console application is merely referred to for the purpose of further illustrating one container configuration of a retrievable article adaptable for use with the present system.

With reference again to FIG. 2, the extractor shuttle 30 when at phantom position 27 is adapted to deposit a container on conveyor belt 32, which belt is moving in the direction depicted by the various directional arrows designated by letter $a$. When a container being retrieved, e.g., phantom outline 24", reaches console 21, it is transferred to conveyor belt 33 (FIG. 5) and is subsequently stopped at a verifier reader station 34, explained in detail hereinafter (see FIG. 1). Assuming now that the container's identity is verified, it then becomes accessible at work station 35 whereupon the documents are conveniently fanned by element 36 which is driven upwardly for registration with container slot 31 as described in my console application, identified above. From the work station the container passes, upon appropriate command, to a conveyor belt 37 (FIG. 5) whereupon transfer mechanism 38 physically transfers it to its initial position with respect to a conveyor belt 40, which latter position is illustrated by phantom outline 41 (FIG. 6). Transfer mechanism 38 includes a pivot arm 42 securely mounted to rotatably driven shaft 43, and biased against stop 44 by spring 45 under nonoperative conditions. When shaft 43 is rotated in direction $b$, an impelling arm 46 operatively engages container 24 (FIG. 6) and urges it to phantom position 41 at which time a second stop member 47 prevents further rotation of pivot arm 42 which is subsequently returned to its nonoperative position by spring 45 when the rotative force is removed from shaft 43.

Subsequently, during the file mode, belt 40 transfers a container at position 41 to belt 48 (FIG. 2) which then conveys the container to be filed into a reading station 50, at which station a sorting function takes place, i.e., the container address is determined insofar as the storage aisle is concerned, and in response to the aisle determination a simple gating sequence is initiated. Now referring to FIGS. 2 and 3 and assuming for exemplary purposes that the home bay for the container being filed is in the first aisle, a gating mechanism 51 is pivoted to the position shown (FIGS. 3 and 4) and the on-coming container is diverted down a chute 52 to a reading station 53. Likewise a gating mechanism 51' and chute 52' are provided for containers destined for a bay in the second aisle, and like arrangements are provided for as many further aisles as are desired.

Gating mechanism 51 is shown in detail at FIG. 4 and comprises drive means 54, such as a motor, mounted on a bracket 55 and adapted to be energized for rotation of shaft 56 in direction $c$. Extending outwardly from shaft 58 and over a belt 60 of return conveyor 26 is deflector arm 61 which, under conditions where drive means 54 is energized, is disposed in the path of oncoming containers. In the nonoperative condition of gating mechanism 51, deflector arm 61 is urgedly returned to the position illustrated by broken lines in FIG. 4. Thus, when drive means 54 is not energized, shaft 56 is urged to its initial position under the influence of a biasing spring, or the like, in a well-known manner.

After the sorting function is accomplished, the reading station 54 (described in further detail hereinafter) determines the precise location in the aisle to which the container is destined, whereupon appropriate positional information is passed to the control mechanism for the extractor, which then is moved to position 62 illustrated in solid lines in FIG. 2 and in phantom outline 28 of FIG. 1. The extractor withdraws the container from the reader in the same manner as it withdraws a container from its storage position. Ultimately, the extractor is positioned opposite the appropriate tier address for discharge of the "in transit" container to its home storage bay.

(B) Addressing

The container 24' referred to above and shown in FIG. 7 includes a tab portion 63, shown in detail in FIG. 8, for receiving indicia representative of the container's home storage bay. The particular coding technique utilized by the subject system is one in which holes are provided on the container in a predetermined pattern and all the folders (one of which is shown in FIG. 9 and referred to by reference numeral 64) assigned to that particular container are accordingly provided with the same coded pattern. It will become readily apparent, however, that folder 64 and container tab 63 by their very nature may be coded by any known technique such as, varying shaped holes, colored spots, magnetic particles, bumps, notches, electrostatic spots, etc.

For exemplary purposes the file folder 64 in FIG. 9 and the container 24' in FIG. 7 are provided with identical codes. Referring to FIG. 8 container tab, one arrangement of possible hole placement is shown. Any number (n) of conveniently patterned holes may be employed as suggested by the phantom presentation depicted. For the disclosed embodiment of the present system, one convenient addressing arrangement that may be employed contemplates the utilization of sixteen holes, i.e., n is equal to sixteen. Hole "1" is present in all patterns to provide a strobing pulse for the sensing means. Holes "2" through "10" are employed to provide a digital code indicating the horizontal position of the container address. By using a means that individually senses the absence or presence of holes "2" through "10," any one of 512 horizontal positions can be designated, i.e., two raised to the ninth power. Likewise, hole "1" through "15" can be utilized to identify 32 possible vertical positions. Lastly, by using hole "16" to indicate either the left or right tier in a particular aisle a container can readily be coded with a specific address in the information-handling system's storage apparatus discussed above. Depending on the desired physical size of the system, the total requirement for number of holes on the tab will vary. Of course, the container tabs and the tabs of the folders assigned thereto must necessarily be in correspondence. It should be noted that this coding system is not limited to one in which a folder must be used, but any article may be stored that lends itself to storage in a container and to which an identifying coded tab may be attached. Also, any desirable external indexing system may be employed by merely providing cards with a similar pattern of holes corresponding to the container address for which external cross-indexing is desired.

The coding arrangement above described is directed to a one-aisle system. In the event more than one aisle is contemplated, the aisle information can likewise be related to a particular sector in the address code. This information is then read and utilized as input for carrying out the sorting function, referred to above. For example, holes "18" and "19" can be utilized to indicate in which of four aisles the container storage address is located. This information is also necessary in determining which extractor mechanism is to be utilized during a retrieve mode operation.

(C) Reading

The information-handling system as thus far disclosed hereinabove necessarily requires in several areas an important reading function to be carried out. More specifically, reading devices are shown in FIG. 1 and include a reader 53 (or 53') disposed as the reading station at the bottom of each chute and adapted to receive a container 24 that has been routed to the associated chute for eventual delivery to the container's home storage bay. These readers (designated by reference numeral 65) are referred to as "address readers" hereinafter and are adapted to sense the particular coded address on the container tab whereupon the information may be readily utilized to initiate the actual control commands given to the extractor mechanism.

Other readers generally shown in FIG. 1 include a console reader 34, a sorting reader 50, a folder reader 66, and a verifying reader 67. These readers can be categorized as container readers and card readers, the latter of which include folder reader 66 and verifying reader 67. These readers are adapted to read (or sense) the apertures in a file folder tab of the nature shown in FIG. 9, when inserted along giude means 68, 70 (FIG. 1) as illustrated at console 21 by exemplary folders 64' and 64". The card reader category comprises readers which will sense a card-type input regardless of its associated body portion. Input devices of this type are common in the electronic data processing industry and are an accurate means of transferring coded information to an electronic processor. For example, some card readers accomplish reading with a set of pins which moves up through card holes to contact switches. This method is particularly well adapted to the present system in that it lends itself to static reading as opposed to dynamic wherein moving cards are read.

Other exemplary contemporary reading devices adaptable for use in the present system make use of wire brushes which touch a steel roll whenever a hole is presented. This method, of course, is not limited to static reading. Another well-known reading technique is accomplished with photocells, which technique lends itself readily to both the card and container readers of the present system. In this method a source of light is placed on one side of the card (or tab) path and photocells are located on the opposite side. When the aperture pattern moves into the read station, light passes through the holes to photocells whereupon electronic data pulses are developed.

Figure 10:
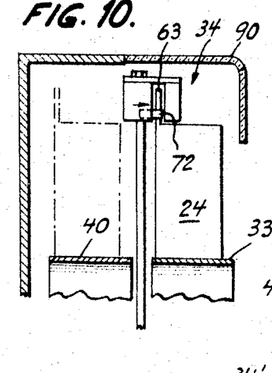
FIG. 10 is a sectional view taken along line 10—10 of FIG. 1.
Figures 11, 12:
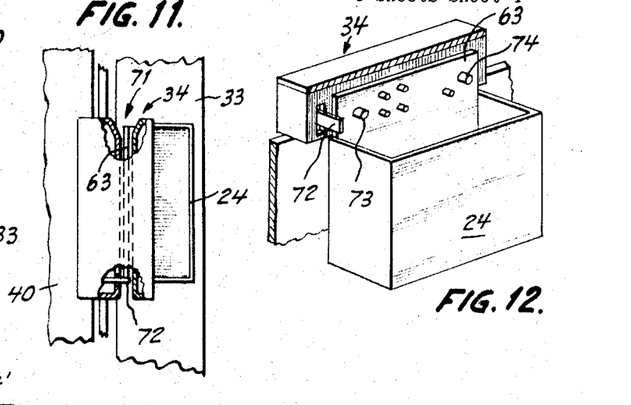
FIG. 11 is a partially cutaway plan view of the apparatus shown in FIG. 10.
FIG. 12 is a partial perspective view of a container tab at a reader station.

The container readers, of which console reader 34 is shown in detail in FIGS. 10, 11 and 12, are adapted to receive a container tab and statically sense the coded pattern in a manner similar to that used for the card readers. The readers include micro-switch sensing means (not shown) for operating mechanical stop means in the path of the particular container being guided to the reading station. Examples of guiding mechanisms for the container tab are illustrated in my extractor application, referred to above, wherein the container is guided to the extractor cavity at which position its presence is sensed by a micro-switch for providing an appropriate electrical signal. The console reader diagrammatically illustrated in FIG. 10 shows a diverging slot 71 (FIG. 11) for receiving a container tab 63 as it is conveyed along belt 33 to the console reader 34. All other container readers disclosed are similar in that they receive a container supported in a like manner on conveyor means in the various conveyance assemblies. It should be apparent that any necessary combination of rollers could be utilized to facilitate the guidance of tab 63 to the mouth of diverging slot 71. Upon such entry, the tab's presence is sensed (e.g., a micro-switch) and stop means 72 project outwardly into the path of the tab to accurately bring the tab to rest in the reader whereupon enlarged alignment pins 73 and 74 (FIG. 12) project into enlarged alignment apertures 75 and 76 (FIG. 8) to facilitate the associated reader function. The stop means is actuated by a solenoid actuator (not shown), or the like, which is commonly employed for this function. In this particular embodiment, following alignment a reader is employed wherein pins are utilized to sense the presence of apertures, the physical position of which pins are then used to provide appropriate signals corresponding to either a "hole" or "no hole" condition.

(D) Verifying

In a system of the magnitude herein discussed, it becomes essential to verify that the container delivered to the console is in fact that container the console operator has retrieved. The various operational steps in the subequent section of this description point out the various retrieval sequences that may be taking place and thereby necessitate such verification, but for the purposes of this part of the description, suffice it to say that the verification feature is a desirable if not necessary (depending on system side, retrieve frequency, etc.) function of the present system.

Figure 13:
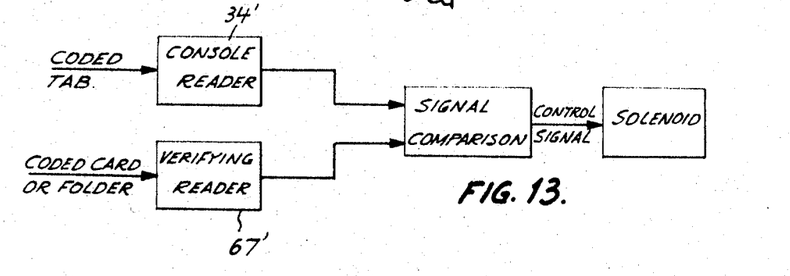
FIG. 13 is a block diagram of the verification means employed in the present system.

The diagram shown in FIG. 13 illustrates the specific elements employed in the vertification arrangement feature in the present system. The console reader 34' accepts the coded tab of the container at its reader station as described above. Simultaneously, the verifying reader 67' is receiving a coded card or folder which is believed to correspond with the container. If identical codes are presented by the folder and container, a signal-comparison network presents a control signal to the solenoid which controls stop means 72 (FIGS. 11 and 12) and thereby permits the container to be delivered to the access opening in the console whereupon the folder may be returned to the container. The signal comparison network receives a separate pulse corresopnding to each aperture that is sensed in the coded patterns of both the folder and container tab. The overall signal (representative of the address) can be readily compared in this manner and thereby sensing the absence of coincidence between a corresponding pair. By standard logic circuitry, a control signal can be initiated in response to the absence of any signal representing a non-coincident counterpart. Thus, the identity of the container delivered at the console is verified.

(E) Control

An extractor 23 is operable in the asile shown (FIG. 1) and a similar mechanism is operable in each of the other aisles in the system. For the purposes of this description, only extractor 23 will be described in detail insofar as its control is concerned. In my extractor application the manner in which a package is received or discharged is illustrated. The extractor is driven to any of the positions adjacent the many bays by selectively driving the horizontal and vertical drive motors. The horizontal motor positions a control column 77 in any of the predetermined positions adjacent the side-by-side columns of bays, and the vertical motor drives the extractor vertically on column 77 to any of the predetermined positions adjacent the stacked rows of bays. Insomuch as the vertical and horizontal control arrangements are similar and independent, only the details of one will be described.

Figure 14:
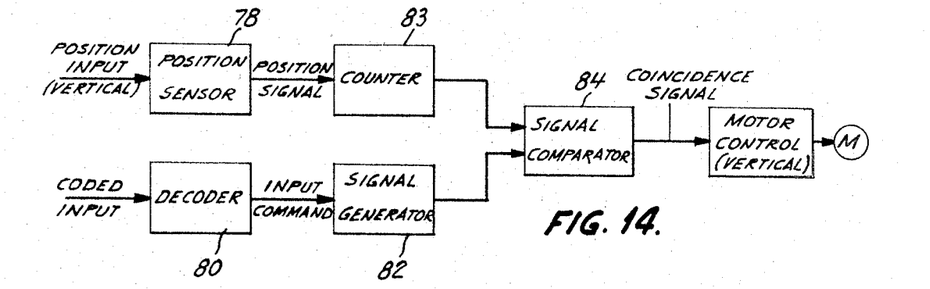
FIG. 14 is a block diagram of a portion of the control apparatus for the present system.

A block diagram of the vertical motor control arrangement is illustrated by FIG. 14. Assuming the extractor has a home reference position from which the various bay locations are counted, the vertical position input is merely an electrical count of the number of rows that are traversed when the extractor moves from its home position which in the case of the first aisle for this example will be phantom position 28, adjacent reader 65. It can be noted that the extractor actually is disposed past the end of the storage tier when in its home position. This situation is readily accommodated by assuring that motion past the tier is in exact multiples of the bay width. Turning again to FIG. 14, the position input is the actual vertical position to which the extractor is driven. This positional information provides an input for position sensor 78 which merely counts the number of shelves (or vertical bay positions past which the extractor is driven, and generates a position signal in the form of consecutive pulses.

Now returning to the commands which activate the extractor drive mechanisms, it will be broadly assumed, for the purpose of this portion of the description, that a coded address on a container selected to be retrieved will include a specific sector relating to vertical positioning information, and that when a command is generated at the console a like coded pattern of positional information appears on a corresponding or associated folder. The code is read at the console and the vertical position in formation is decoded by decoder 80 which yields a signal corresponding to the vertical position of the bay at which the requested container is stored. Of course, regardless of the mode, the extractor may be similarly positioned in response to the presence of a coded input at any other input means, such as an input entered at a manual keyboard 81 (FIG. 1) or the like. Regardless of the input means, the input command is decoded and fed to a signal generator 82 which generates a signal analogue, e.g., a predetermined discrete voltage level corresponding to ascending vertical rows. Meanwhile, the vertical motor is energized and the extractor begins to ascend, which in turn initiates the generation of position pulses which are counted by a counter 83 which also generates a step voltage output which ascends in discrete increments corresponding to the pulses being counted. The step voltage ascends in increments equal to the change of voltage level generated by signal generator 82 in response to the input command from decoder 80. Accordingly, two input levels are fed to a signal comparator 84 which senses the presence of the input signal levels and produces an output in response to simultaneous entry of like signals. Output from the comparator is coupled to the motor control and deenergization takes place in response to the coincidence signal. Thus, the motor is accurately controlled to drive the extractor to any selected position. Likewise, the motor can be reversed in a well-known manner, and returned to the level of conveyor 25 or reader 65, it being understood, of course, that a similar horizontal drive arrangement is utilized in the manner for driving the extractor and control column from side to side.

For the purpose of expediency, the circuits in each of the above-mentioned blocks will not be described in further detail. Circuitry well known in the art may readily be employed to function in the prescribed manner in accordance with the explained input and output functions attributed to such blocks. It is to be understood that this reasoning applies equally well to the various sections of the present system that are illustrated through this description by blocks or brief, generally acceptable symbols, phrases or the like.

Figure 15:
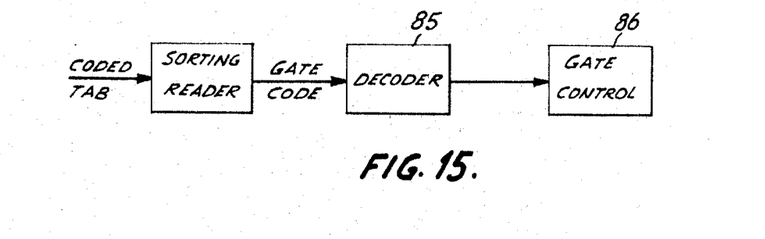
FIG. 15 is a block diagram of the electro-mechanical sorter employed in the present system.

In the file mode of the present system, the input commands are initiated in a manner similar to those mentioned above, i.e., a coded address is fed to the system which corresponds to a particular storage bay in the system. If a container is being filed, it is automatically returned via conveyor 26 to sorter reader 50 which determines by the tab code on such container the aisle of the container home address. The sorter reader 50 thus physically receives the coded tab (FIG. 15) and provides output corresponding to the code information for the particular gate that must be controlled to invert the container to the appropriate chute. The gate code is decoded by decoder 85 which develops an output pulse for selectively controlling the various gate drive mechanisms, all of which are included in a gate control 86, coupled to the decoder, which employs simple logic components capable of selecting a particular control.

(F) Operation

Figure 16:
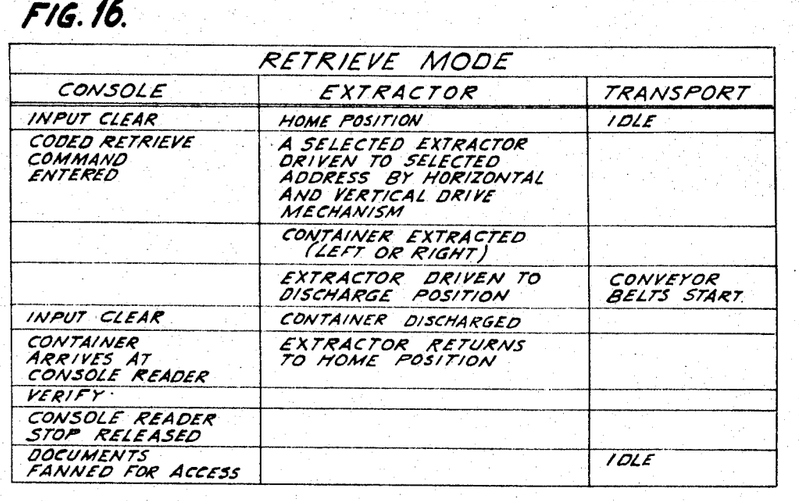
FIG. 16 is a chart illustrating the retrieve mode of the present system.
Figure 17:
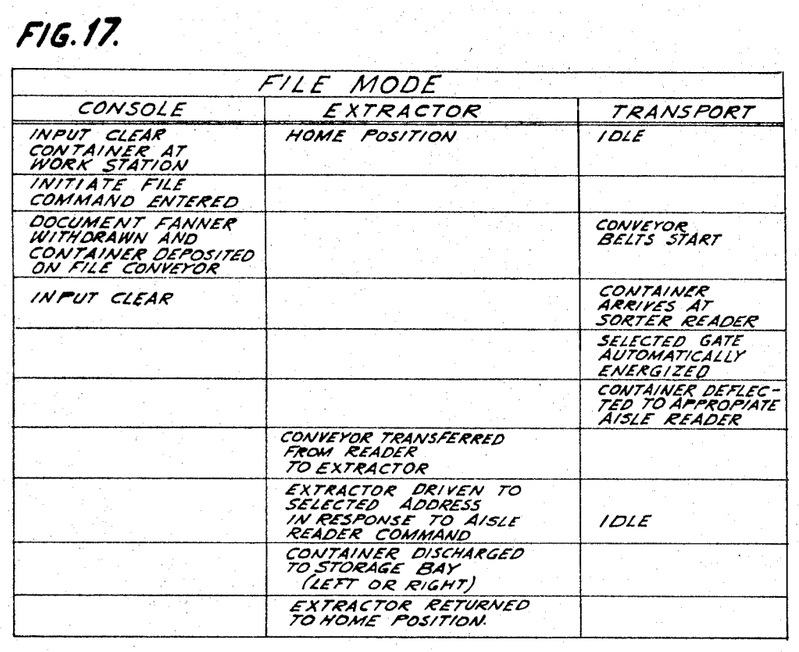
FIG. 17 is a chart illustrating the file mode of the present system.

In operation the system of the present invention is controlled by an operator stationed at console 21 (FIG. 1). Many operational procedures are possible with unlimited combinations of variations according to prevailing conditions, size of the system, type of business involved, etc. The modes of procedure now to be set forth are merely exemplary in nature to illustrate the disclosed embodiment. The two principal modes of the present system are generically referred to as the "retrieve" and "file" modes; however, in most circumstances the operator operates the system in both modes in a consecutive manner. FIGS. 16 and 17 set forth in chart form the general sequence of operational steps that take place throughout the system in retrieve and file modes, respectively. The system's operation will first be explained from the operator's standpoint, i.e., the actual steps that take place at the console. The three principal situations that give use to operation in the retrieve mode are: (1) the operator wishes a container to be retrieved for inspection of the contents thereof and removal of one or more particular articles, such as file folders, therefrom, (2) the operator wishes a container to be retrieved for filing of a folder that has been removed, and (3) the operator wishes a container to be retrieved for filing of a new folder into the system. The four main conditions under which the file mode takes place include filing after any of the three listed retrieve modes of operation have been completed or when a new container is introduced into the system for automatic storage at a bay known to be vacant.

Now it will be assumed that an operator has received the "Smith" folder for refiling into the appropriate storage container. Refiling orders can be retained temporarily in console file 87. The folder is removed from file 87 and the tab thereof is inserted into reader 66 along guide 68 (FIG. 1). The machine has now been commanded to retrieve the container which has a coded address identical to the code on the "Smith" folder tab. During automatic retrieval the operator puts the folder in temporary hold recess 88 in console 21 and performs other tasks until the container becomes visible through transparent wall 90 of console reader 21. Presumably the "Smith" container has been retrieved; however, in the event that more than one container request has been lodged, it will not be apparent that the proper container is presented without a visible inspection. To obviate the necessity for a visible inspection and to eliminate the possibility of operator error, the system includes a verifying arrangement which eliminates the possibility of misfiling. To this end, the retrieved container awaits the operator's next step of removing the "Smith" folder from recess 88 and the insertion of the tab thereof into verifying reader 67 along a guide 70 (FIG. 1), releasing the "Smith" container from console reader 34. The operator who then has the proper "Smith" file in his or her hands is able to file it in the container which next appears at access opening 35, thus eliminating the probability of misfiling.

In the event the retrieve mode is initiated for the retrieval of a folder already in storage, an operator card is inserted into reader 66 for system command input. The card can be stored in any convenient manner, e.g., in console drawer 91 with appropriate indexing for ready access. Each stored container thus has a card with the identical address code pattern thereon. (In the alternative it should be noted that the input command can be manually introduced at keyboard 81.) When the container is en route to the console, the card is conveniently held in recess 92 for temporary storage. Appearance of the container at transparent wall 90 again initiates the verifying sequence, which is carried out with the coded card being held in recess 92, in the same manner as if it were the "Smith" folder discussed above. When the container becomes accessible, the desired folder is removed and placed in active console file 93 for necessary action by the requestor. It should be noted that the necessity and convenience of the verifier become apparent when considering the mentioned steps concerning the cards, viz., both cards and folders may be held for verifying retrieved containers and without the verifier it can only be presumed that the first arrival at the console is the first-ordered container.

During file mode a container is returned to the system automatically from the console and follows a series of events which are apparent when viewing the FIG. 17 chart which is self-explanatory. It should be noted that reference to my two above-mentioned co-pending applications will aid in the clarification and thereby supplement the steps set forth in the charts of FIGS. 16 and 17.

Many advantages of the present invention have been explicitly and/or implicitly set forth in the above description. Prevalent among these advantages is the flexibility of the novel information-handling system to accommodate systems of varying size and nature without sacrificing economy, accuracy, speed and simplicity. It should again be emphasized that another, but not the only other important advantage is the verification scheme.

Although a specific embodiment of the invention has been illustrated and described in detail by way of example, it is to be understood that the invention is not limited thereto.

I claim:
1. An article-handling system, the combination comprising:
  (a) means for storing a plurality of discrete articles each at a predetermined home location identified by the coded address, said storing means comprising:
    (1) a plurality of storage bays for receiving said articles and associated with an appropriate coded address, said bays being accessible from a common direction,
  (b) a control console comprising:
    (1) input means for providing signals in response to coded commands, and
    (2) a work station,
  (c) means for selectively retrieving any selected article in response to said commands and comprising:
    (1) means operative adjacent said storage bays for withdrawing said selected article from its predetermined home location,
    (2) means for transporting said selected article from its associated storage bay to a first position, and
    (3) first conveyance means for conveying said articles from said first position to said control console work station,
  (d) means for filing said selected article comprising:
    (1) second conveyance means for conveying articles from said console work station to a second position,
    (2) means for transferring said selected article from said work station to said second conveyance means,
    (3) said second conveyance means including means for receiving said selected article adjacent said transporting means, and
    (4) said transporting means including means for receiving said selected article under conditions where said article is at said receiving means, which transporting means is adapted to return said article to said associated predetermined storage bay.

2. An article-handling system as set forth in claim 1 wherein:
  coded means are provided on each article representative of the coded address corresponding to its associated storage bay,
  and said filing means further comprise:
    means for sensing the coded information on said selected article,
    control means responsive to said sensing means to provide appropriate positional information for said transporting means, and
    means coupling said control means to said transporting means.

3. An article-handling system as set forth in claim 2 wherein said control console further comprises:
  verifier means at said work station for preventing access to said selected article under conditions where the coded means on said selected article have not been ascertained, said verifier means including means for sensing the coded address on said selected article, means for providing a first signal in response to said sensed code, means for selectively providing a second signal corresponding to the coded address of any of said bays, means for comparing said first and second signals, and stop means for preventing said first conveyance means from conveying said selected article to said work station when said first and second signals are not in correspondence.

4. An article-handling system, the combination comprising:
(a) means for storing a plurality of discreet articles each at a predetermined home location identified by a coded address,
   (1) said storing means comprising at least two opposing banks of bays defining one or more aisles therebetween,
(b) a control console comprising:
   (1) input means for providing signals in response to coded commands, and
   (2) a work station,
(c) means for selectively retrieving said articles in response to said commands and comprising:
   (1) conveyance means between said console work station and said storing means,
   (2) means operative in said aisles for withdrawing a selected article from a predetermined storage bay at its home location, and
   (3) means for transporting said selected article to said conveyance means,
   (4) said transporting means comprising means for depositing said selected article on said conveyance means, whereby any article may be automatically retrieved from said storing means and made accessible at said work station,
(d) means for filing said selected article comprising second conveyance means for conveying articles from said console work station to said transporting means, means for transferring said selected article from said work station to said second conveyance means, said second conveyance means including means for receiving said selected article adjacent said transporting means including means for receiving said selected article under conditions where said article is at said receiving means, which transporting means is adapted to return said selected article to said predetermined storage bay.

5. An article-handling system as set forth in claim 4 wherein:
coded means are provided on each article representative of the coded address corresponding to its associated storage bay,
and said filing means further comprise:
   means for sensing the coded information on said selected article,
   control means responsive to said sensing means to provide appropriate positional information for said transporting means, and
   means coupling said control means to said transporting means.

6. An article-handling system as set forth in claim 5 wherein said control console further comprises:
verifier means at said work station for preventing access to said selected article under conditions where the coded means on said selected article have not been ascertained,
said verifier means including means for sensing the coded address on said selected article,
means for providing a first signal in response to said sensed code,
means for selectively providing a second signal corresponding to the coded address of any of said bays,
means for comparing said first and second signals, and stop means for preventing said first conveyance means from conveying said selected article to said work station when said first and second signals are not in correspondence.

7. Record storage and retrieval apparatus comprising:
(a) a plurality of containers for holding the records,
(b) a substantially vertical bank for storing said containers,
(c) means for removably positioning said containers in rows and columns in said vertical bank,
(d) coded means on each of said containers representative of its position in said bank,
(e) extractor means for removing a selected container from said bank,
(f) means for effecting movement of said extractor means through predetermined horizontal and vertical directions to said selected container position,
(g) means for withdrawing the selected container from its position in said bank to said extractor means,
(h) said means for effecting movement of said extractor adapted to effect movement of said extractor means to a discharge position,
(i) a remotely positioned work station,
(j) first conveyance means extending between said discharge position and said work station,
(k) means for moving said container from said extractor means to said conveyance means at said discharge position whereby said container is conveyed to said work station,
(l) stop means at said work station for stopping said container in a position of access to its contents,
(m) a receiving station adjacent said discharge position,
(n) second conveyance means extending between work station and said receiving station,
(o) means for inactivating said stop means and moving said container from said access position to said second conveyance means for transport to said receiving station,
(p) said withdrawing means adapted to move said container from said receiving station to said extractor means,
(q) means for reading the coded information on said container and in response thereto effecting predetermined vertical and horizontal movements of said extractor means to return said container to its original position in said bank.

8. Record storage and retrieval apparatus as set forth in claim 7 wherein said means for reading is positioned at said receiving station.

9. Record storage and retrieval apparatus as set forth in claim 8 wherein said means for reading comprise:
means for sensing the coded means on said selected container,
control means responsive to said sensing means to provide appropriate positional information for said extractor means, and
means coupling said control means to said means for effecting movement of said extractor means.

10. Record storage and retrieval apparatus as set forth in claim 7 wherein verifier means are provided at said work station for preventing access to said selected container under conditions where the coded means of said container have not been ascertained, said verifier means including:
means for sensing the coded means on said selected container,
means for providing a first signal in response to said sensed code,
means for providing a second signal corresponding to the coded position of said selected container in said bank,
means for comparing said first and second signals, and second stop means for preventing said first conveyance means from conveying said container to said work station when said first and second signals are not in correspondence.

11. Record storage and retrieval apparatus comprising:
(a) a plurality of containers for hloding the records,
(b) a plurality of substantially vertical banks for storing said containers, said banks each comprising first and second tiers disposed in a face-to-face array whereby a plurality of aisles are defined by said first and second tiers,
(c) means for removably positioning said containers in rows and columns in said tiers,
(d) coded means on each of said containers representative of its position in a predetermined tier,
(e) extractor means operatively disposed on each aisle for removing any selected container from said banks,
(f) means for effecting movement of a selected extractor means through predetermined horizontal and vertical directions to said selected container position in its associated tier,
(g) means for withdrawing the selected container from its position in said predetermined tier to said selected extractor means,
(h) said means for effecting movement of said selected extractor adapted to effect movement of said selected extractor means to a discharge position,
(i) a remotely positioned work station,
(j) first conveyance means extending between said discharge position and said work station,
(k) means for moving said selected container from said selected extractor means to said conveyance means at said discharge position whereby said selected container is conveyed to said work station,
(l) stop means at said work station for stopping said selected container in a position of access to its contents,
(m) a receiving station adjacent said terminal position,
(n) second conveyance means extending between said work station and said receiving station,
(o) means for inactivating said stop means and moving said selected container from said access position to said second conveyance means for transport to said receiving station,
(p) said withdrawing means adapted to move said selected extractor means,
(q) means for reading the coded information on said selected container and in response thereto effecting predetermined vertical and horizontal movements of said selected extractor means to return said selected container to its original position in said associated tier.

12. Record storage and retrieval apparatus as set forth in claim 11 wherein said second conveyance means includes sorter means comprising a plurality of gating means each associated with an aisle for diverting said selected container to the appropriate selected extractor means.

13. Record storage and retrieval apparatus as set forth in claim 12 wherein said sorter means further comprise:
second means for reading said coded means on said selected container, and means responsive to said reading means for operatively positioning said gates in accordance with the aisle associated with said selected container.

14. Record storage and retrieval apparatus as set forth in claim 12 wherein a plurality of reading means are provided, one each associated with a particular aisle, and a plurality of receiving stations are provided one each corresponding to an associated reader.

15. Record storage and retrieval apparatus as set forth in claim 14 wherein each of said reading means comprise:
means for sensing the coded means on said selected container,
control means responsive to said sensing means to provide appropriate positional information for the appropriate selected extractor means, and
means coupling said control means to said means for effecting movement of said appropriate extractor means.

16. Record storage and retrieval apparatus as set forth in claim 12 wherein verifier means are provided at said work station for preventing access to said selected container under conditions where the coded means of said container have not been ascertained, said verifier means including:
means for sensing the coded means on said selected container,
means for providing a first signal in response to said sensed code,
means for providing a second signal corresponding to the coded position of said selected container in said bank,
means for comprising said first and second signals, and
second stop means for preventing said first conveyance means from conveying said container to said work station when said first and second signals are not in correspondence.

References Cited
UNITED STATES PATENTS

| | | | |
|---|---|---|---|
| 2,386,520 | 10/1945 | Watson | 312—223 |
| 2,707,666 | 5/1955 | Becker | 312—223 |
| 2,965,291 | 12/1960 | Hayes et al. | 235—61.11 |
| 2,974,803 | 3/1961 | Humphrey | 214—16.4 X |
| 3,076,566 | 2/1963 | Dennis | 214—16.4 |
| 3,049,247 | 8/1962 | Lemelson | 214—16.4 |
| 3,297,379 | 1/1967 | Artaud et al. | 312—223 |

GERALD M. FORLENZA, Primary Examiner

R. B. JOHNSON, Assistant Examiner

U.S. Cl. X.R.

129—16.1; 214—16.4